US012776439B2

(12) United States Patent
Bower et al.

(10) Patent No.: US 12,776,439 B2
(45) Date of Patent: Oct. 27, 2026

(54) BOBBIN WOUND COIL FOR AN ELECTROMAGNETIC COUPLING

(71) Applicant: Warner Electric Technology LLC, Braintree, MA (US)

(72) Inventors: Nicholas Chase Bower, Beloit, WI (US); Brian Keith Holmbeck, Sharon, WI (US); Michael Edwin Humy, Roscoe, IL (US); Daravanh Vongsavanthong, Rockton, IL (US); George Patrick Gill, Rockton, IL (US)

(73) Assignee: Warner Electric Technology LLC, Braintree, MA (US)

( * ) Notice: Subject to any disclaimer, the term of this patent is extended or adjusted under 35 U.S.C. 154(b) by 778 days.

(21) Appl. No.: 18/142,604

(22) Filed: May 3, 2023

(65) Prior Publication Data

US 2023/0360829 A1 Nov. 9, 2023

Related U.S. Application Data

(60) Provisional application No. 63/338,058, filed on May 4, 2022.

(51) Int. Cl.

*H01F 27/29* (2006.01)
*H01F 5/02* (2006.01)
(Continued)

(52) U.S. Cl.

CPC ............ *H01F 27/325* (2013.01); *H01F 5/02* (2013.01); *H01F 5/04* (2013.01); *H01F 27/29* (2013.01);
(Continued)

(58) Field of Classification Search

CPC . H01F 27/325; H01F 5/02; H01F 5/04; H01F 27/29; H01F 41/06; H01F 41/082;
(Continued)

(56) References Cited

U.S. PATENT DOCUMENTS 3,359,520 A 12/1967 Foerster
3,932,828 A 1/1976 Plunkett et al.
(Continued)

FOREIGN PATENT DOCUMENTS

DE 8234556 U1 2/1984
JP 11-67526 A 3/1999
JP 2000-208354 A 7/2000

OTHER PUBLICATIONS

International Search Report issued in corresponding International (PCT) Patent Application No. PCT/US2023/020761 (Aug. 25, 2023).
(Continued)

*Primary Examiner* — Tuyen T Nguyen
(74) *Attorney, Agent, or Firm* — Armstrong Teasdale LLP

(57) ABSTRACT

A bobbin wound coil for an electromagnetic coupling includes a bobbin having a cylindrical body, end flanges disposed at opposite ends of the body and a terminal connector defining a central cavity bordered, in part, by inner and outer walls and a side wall extending between the inner and outer walls. A coil has a beginning portion extending through first openings in the inner and outer walls, an end portion extending through second openings in the inner and outer walls, and a center portion wound about the bobbin body. The first and second openings in the inner wall divide the inner wall into first and second circumferential end sections and a center section. A portion of one of the circumferential end sections and the center section is spaced from the side wall to define a recess configured to receive one of the beginning and end portions of the coil.

20 Claims, 7 Drawing Sheets

(51) Int. Cl.

| | |
|---|---|
| ***H01F 5/04*** | (2006.01) |
| ***H01F 27/32*** | (2006.01) |
| ***H01F 41/06*** | (2016.01) |
| ***H01F 41/082*** | (2016.01) |
| ***H01F 41/098*** | (2016.01) |
| ***H01F 41/10*** | (2006.01) |

(52) U.S. Cl.
CPC ........... *H01F 41/06* (2013.01); *H01F 41/082* (2016.01); *H01F 41/098* (2016.01); *H01F 41/10* (2013.01)

(58) Field of Classification Search
CPC ... H01F 41/098; H01F 41/10; H01F 2007/062
USPC .................................... 336/90, 192, 196, 198
See application file for complete search history.

(56) References Cited

U.S. PATENT DOCUMENTS

| | | | | |
|---|---|---|---|---|
| 4,166,265 | A * | 8/1979 | Reynolds ................ | H01F 41/10 29/605 |
| 4,183,607 | A | 1/1980 | Hughes | |
| 4,251,911 | A | 2/1981 | Reynolds et al. | |
| 4,258,973 | A | 3/1981 | Reynolds et al. | |
| 4,672,348 | A | 6/1987 | Duve | |
| 4,702,646 | A | 10/1987 | Morris | |
| 4,904,974 | A | 2/1990 | Tsuji | |
| 5,153,550 | A | 10/1992 | Sugiura et al. | |
| 5,912,518 | A * | 6/1999 | Misik ..................... | H02K 5/225 310/191 |
| 5,977,551 | A * | 11/1999 | Sawahata ................ | G06F 30/23 250/398 |
| 7,017,851 | B2 | 3/2006 | Matsuura et al. | |
| 7,348,696 | B2 | 3/2008 | Sonohara et al. | |
| 7,732,959 | B2 | 6/2010 | Pardee | |
| 7,902,954 | B2 | 3/2011 | Bamber et al. | |
| 2008/0252181 | A1 | 10/2008 | Suzuki et al. | |
| 2008/0290979 | A1 | 11/2008 | Suzuki et al. | |

OTHER PUBLICATIONS

Written Opinion issued in corresponding International (PCT) Patent Application No. PCT/US2023/020761 (Aug. 25, 2023).
Office Action issued in U.S. Appl. No. 18/142,607.
English (machine) Translation of JP 11-67526 A.

* cited by examiner

BOBBIN WOUND COIL FOR AN ELECTROMAGNETIC COUPLING

CROSS-REFERENCE TO RELATED APPLICATIONS

This patent application claims, under 35 U.S.C. § 119, the benefit and priority of U.S. Provisional Patent Application No. 63/338,058 filed on May 4, 2022, the entire disclosure of which is incorporated by reference herein.

BACKGROUND OF THE INVENTION a. Field of the Invention

This invention relates to electromagnetic couplings. In particular, the invention relates to an improved bobbin wound coil for an electromagnetic coupling.

b. Background Art

A conventional electromagnetic coupling includes an armature on which forces are applied to move the armature between positions of engagement with or disengagement from a rotor or friction disc in order to transfer of a rotational or braking torque between one body coupled to the armature and another body coupled to the rotor or friction disc. The armature is moved to at least one of the engagement and disengagement positions by electromagnetic forces generated when an electromagnet disposed on one side of the armature is energized to create an electromagnetic circuit between the electromagnet and armature and draw the armature towards the electromagnet and towards or away from the rotor or friction disc. The electromagnet includes a field shell made from materials having a relatively low magnetic reluctance and a conductor to which current is provided to energize the electromagnet and create the electromagnetic circuit by causing flux to flow within and between the field shell and armature. The conductor typically comprises a coil that is wound about a bobbin mounted on or within the field shell and connected to an external power source.

Conventional bobbins wound coils have one or more disadvantages. A conventional bobbin includes a cylindrical body, flanges extending radially outwardly from each end of the body and defining interior sides facing the cylindrical body and exterior sides facing away from the cylindrical body and a terminal connector formed on the exterior side of one of the end flanges and proximate a radially outer edge of the end flange. When the coil is wound onto the bobbin, the beginning portion of coil typically passes through the terminal connector and end flange near the radially outer edge of the end flange and then moves radially inward along the end flange onto the cylindrical body of the bobbin. The coil is then repeatedly wound about the cylindrical body and, eventually, an end portion of the coil is again passed through end flange and the terminal connector near the radially outer edge of the end flange. As the coil is wound about the body of the bobbin, the coil must pass over the radially inwardly extending section of the beginning portion of the coil and an outwardly projecting bulge is often formed in the exterior side of one of the flanges to accommodate this winding pattern thereby creating manufacturing and packaging issues. Conventional bobbins also frequently lack adequate mechanisms and/or require additional mechanisms to adequately tension the beginning and end portions of the coil during winding of the coil and/or to secure the beginning and end portions of the coil within the terminal connector during winding. In some conventional bobbins, one or more of the flanges in the bobbin may also be formed with recesses on the exterior side of the flange to balance objectives in strengthening the end flanges while reducing weight and materials. Depending on the application and operating environment for the electromagnetic clutch, however, these recesses may collect fluids and debris. Finally, some conventional bobbins (and the coils mounted thereon) are also subject to rotation relative to the field shell on which the bobbins are mounted as a result of torque transfer during operation of the coupling.

The inventors herein have recognized a need for a bobbin wound coil for an electromagnetic coupling that will minimize and/or eliminate one or more of the above-identified deficiencies.

BRIEF SUMMARY OF THE INVENTION

This invention relates to electromagnetic couplings. In particular, the invention relates to an improved bobbin wound coil for an electromagnetic coupling.

A bobbin wound coil for an electromagnetic coupling in accordance with one embodiment includes a bobbin including a cylindrical body disposed about a central axis. The bobbin further includes a first end flange disposed at a first axial end of the cylindrical body and extending radially outwardly therefrom, the first end flange defining an interior side facing the cylindrical body and an exterior side facing away from the cylindrical body and a second end flange disposed at a second axial end of the cylindrical body and extending radially outwardly therefrom, the second end flange defining an interior side facing the cylindrical body and an exterior side facing away from the cylindrical body. The bobbin further includes a terminal connector on an exterior side of the first end flange. The terminal connector includes a body defining a central cavity and includes axially spaced inner and outer walls, first and second circumferentially spaced side walls extending between the inner and outer walls and a radially inner side wall extending between the inner and outer walls. A coil includes a beginning portion extending through first openings in each of the inner and outer walls of the body of the terminal connector, an end portion extending through second openings in each of the inner and outer walls of the body of the terminal connector, and a center portion extending between the beginning portion and the end portion and wound about the cylindrical body. The inner wall of the body of the terminal connector includes first and second circumferential end sections and a center section disposed between the first and second circumferential end sections and separated from the first and second circumferential end sections by corresponding ones of the first and second openings in the inner wall. A portion of one of the first circumferential end section, the second circumferential end section, and the center section is spaced from the radially inner side wall to define a first recess configured to receive one of the beginning portion and the end portion of the coil.

A method of forming a bobbin wound coil for an electromagnetic coupling in accordance with one embodiment includes providing a bobbin including a cylindrical body disposed about a central axis, a first end flange disposed at a first axial end of the cylindrical body and extending radially outwardly therefrom, the first end flange defining an interior side facing the cylindrical body and an exterior side facing away from the cylindrical body, a second end flange disposed at a second axial end of the cylindrical body and extending radially outwardly therefrom, the second end flange defining an interior side facing the cylindrical body and an exterior side facing away from the cylindrical body, and a terminal connector on the exterior side of the first end flange. The terminal connector includes a body defining a central cavity and includes axially spaced inner and outer walls, first and second circumferentially spaced side walls extending between the inner and outer walls and a radially inner side wall extending between the inner and outer walls. The inner wall of the body of the terminal connector includes first and second circumferential end sections and a center section disposed between the first and second circumferential end sections and separated from the first and second circumferential end sections by first and second openings in the inner wall. A portion of one of the first circumferential end section, the second circumferential end section, and the center section spaced from the radially inner side wall to define a first recess. The method further includes inserting a beginning portion of a coil through the first opening in the inner wall of the terminal connector, winding the coil about the cylindrical body and inserting an end portion of the coil through the second opening in the inner wall of the terminal connector wherein one of the beginning portion and end portion of the coil extends through the first recess.

A bobbin wound coil in accordance the teachings herein represent an improvement as compared to conventional bobbin wound coils used in electromagnet couplings. In particular, the bobbin wound coil is configured to secure the beginning and/or end portions of the coil within the terminal connector of the bobbin during winding of the coil.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
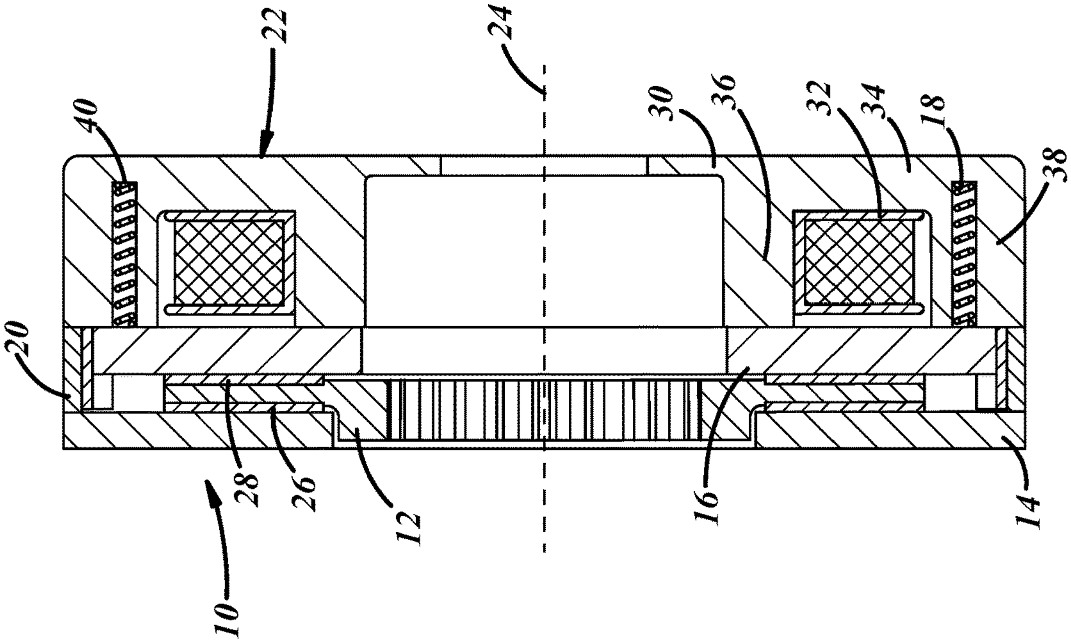
FIG. 1 is a cross-sectional view of one embodiment of an electromagnetic coupling that may include a bobbin wound coil in accordance with the teachings herein.

Referring now to the drawings wherein like reference numerals are used to identify identical components in the various views, FIG. 1 illustrates an electromagnetic coupling 10 including a bobbin wound coil. In the illustrated embodiment, coupling 10 provides a braking torque to a rotating body such as a shaft, gear, pulley, blade, etc. in order to slow or halt rotation of the rotating body. It will be understood by those of ordinary skill in the art that device 10 be may be used in a wide variety of industrial and other applications requiring a brake. Although coupling 10 functions as a brake in the illustrated embodiment, it should be understood that the embodiments of the bobbin wound coil disclosed herein could also be used on electromagnetic couplings configured to function as a clutch to transfer torque from a rotating body to a rotatable body. Device 10 may include a rotor 12, a brake plate 14, an armature 16, springs 18, a spacer 20 and an electromagnet 22.

Rotor 12 is provided to transmit a braking torque to a shaft or other rotating body. Rotor 12 may be made from conventional metals or plastics and may be made by stamping, molding and/or machining. Rotor 12 may be annular in shape and disposed about, and centered about, a rotational axis 24. Rotor 12 is coupled to, and configured for rotation with, a shaft (not shown) about axis 24 and may be rotationally coupled to the shaft in a variety of ways that permit axial movement of rotor 12 relative to the shaft to enable proper operation of device 10 and account for wear, vibration, runout or thermal expansion. For example, the radially inner surface of rotor 12 and the radially outer surface of the shaft may have complementary, torque transmitting, shapes such as splines (as shown in the illustrated embodiment), a key and keyway, single or double D-shape or hexagonal shape. Rotor 12 includes friction surfaces on opposed sides 26, 28 configured to engage brake plate 14 and armature 16, respectively, during application or engagement of the brake.

Brake plate 14 is configured to engage rotor 12 during application of the brake to transmit a braking torque to rotor 12. Brake plate 14 provides a reaction surface against which armature 16 presses rotor 12 during application of the brake. Brake plate 14 may be made from conventional metals or plastics and may be made from steel (including stainless steel) in some embodiments. Brake plate 14 is disposed on side 26 of rotor 12. Brake plate 14 may further be disposed about, and centered about, axis 24. Brake plate 14 is fixed against rotation and may be coupled to electromagnet 22 using a plurality of axially extending fasteners such as bolts, pins, screws or the like.

Armature 16 is also configured to engage rotor 12 during application of the brake to transmit a braking torque to rotor 12. Armature 16 may be made from metals or metal alloys or other materials having relatively low magnetic reluctance such as iron or steel. Armature 16 is disposed on side 28 of rotor 12. Armature 16 may further be disposed about, and centered about, axis 24. Armature 16 is fixed against rotation, but is axially movable towards and away from rotor 12 and brake plate 14 to permit engagement and disengagement of the brake. Armature 16 may include a plurality of bores extending through armature 16 or a plurality of recesses in the radially outer surface of armature 16 configured to permit fasteners connecting brake plate 14 and electromagnet 22 to pass through armature 16. In this manner, the fasteners limit or prevent rotation of armature 16 about axis 24, but armature 16 is permitted to move along axis 24.

Springs 18 provide a means for biasing armature 16 in one direction along axis 24 towards rotor 12 and brake plate 14 to engage the brake. Springs 18 may be disposed between electromagnet 22 and armature 16. It should be understood that coupling 10 may include either a single annular spring 18 or a plurality of springs 18 disposed in an annular array about axis 24. In the latter case, springs 18 may be spaced equally circumferentially spaced about axis 24.

Spacer 20 is provided to position and orient brake plate 14 and electromagnet 22 relative to one another and to define, together with brake plate 14 and electromagnet 22, an enclosed space containing rotor 12 and armature 16. Spacer 20 may be made from conventional materials including metals, such as aluminum, or plastics that are non-magnetic or have a relatively high magnetic reluctance. Spacer 20 may include a plurality of equally circumferentially spaced, radially inwardly extending flanges that define fastener bores aligned with corresponding bores in brake plate 14 and electromagnet 22 and are configured to receive fasteners extending through brake plate 14, spacer 20 and electromagnet 22 in order to couple brake plate 14, spacer 20 and electromagnet 22 together. Upon assembly, spacer 20 is disposed radially outwardly of rotor 12 and armature 16 with one axial end of spacer 20 abutting brake plate 14 and an opposite axial end abutting electromagnet 22.

Electromagnet 22 provides a means for urging armature 16 in the opposite direction along axis 24 away from rotor 12 and brake plate 14 to disengage the brake. Electromagnet 22 may include a field shell 30 and a conductor in the form of a bobbin wound coil 32. Field shell 30 houses bobbin wound coil 32 and may also provide structural support and orient other components of device 10 including brake plate 14 and springs 18. Field shell 30 may be annular in shape and disposed about, and centered about, axis 24 and may be disposed on a side of armature 16 opposite rotor 12. Field shell 30 may be made from materials having a relatively low magnetic reluctance such as ferromagnetic materials. Field shell 30 may define a radially extending end wall 34 and axially extending, radially aligned, inner and outer walls 36, 38 that extend axially from end wall 34 towards armature 16. Outer wall 38 may define one or more closed bores 40 configured to receive one end of each spring 18. Outer wall 38 may also define one or more closed bores (not shown) configured to receive fasteners coupling brake plate 14, spacer 20 and electromagnet 22. Bobbin wound coil 32 is configured to be received within field shell 30 between walls 36, 38. Current supplied to the coil creates an electromagnetic circuit that includes armature 16 and field shell 30. The electromagnetic circuit urges armature 16 towards field shell 30 and away from rotor 12 against the force of springs 18 to disengage the brake.

Figure 3:
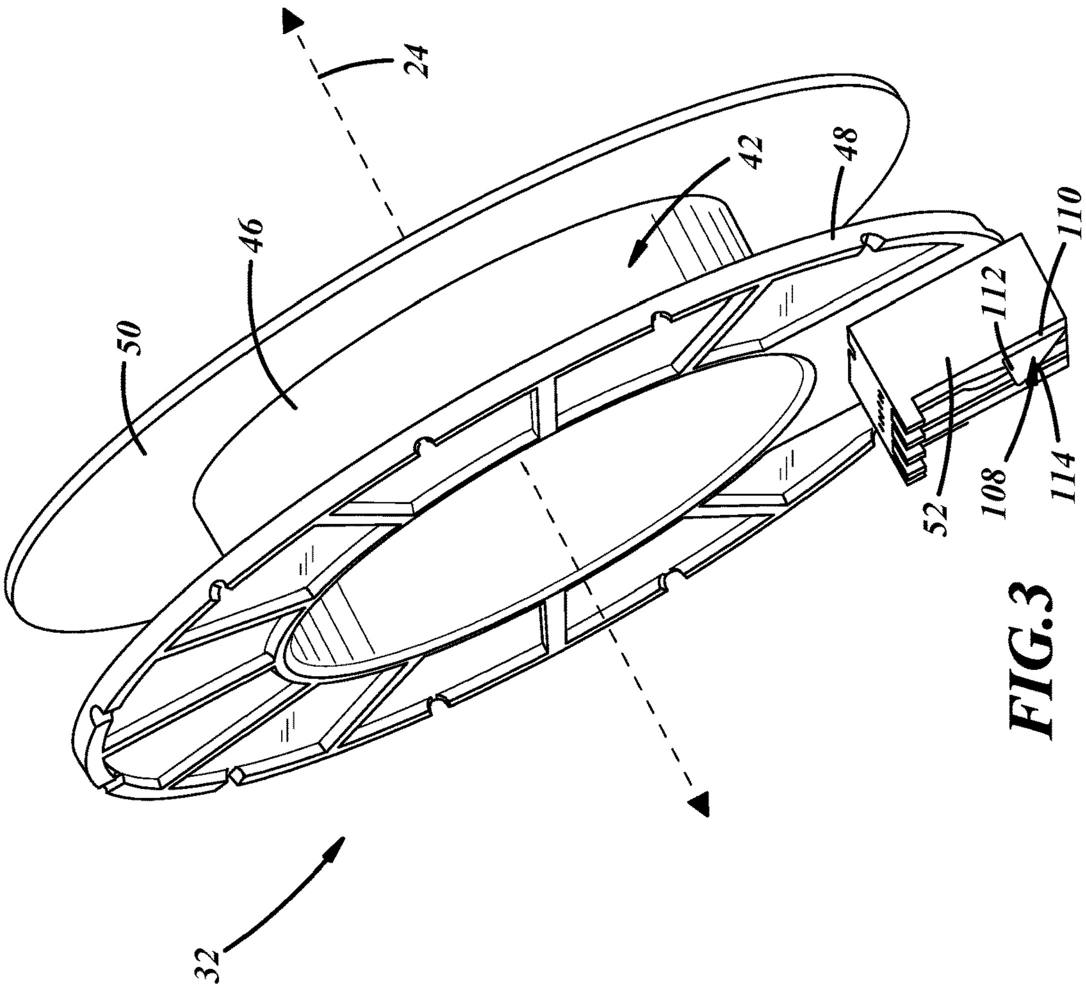
FIGS. 2-4 are perspective views of one embodiment of a bobbin wound coil in accordance with the teachings herein.
Figure 2:
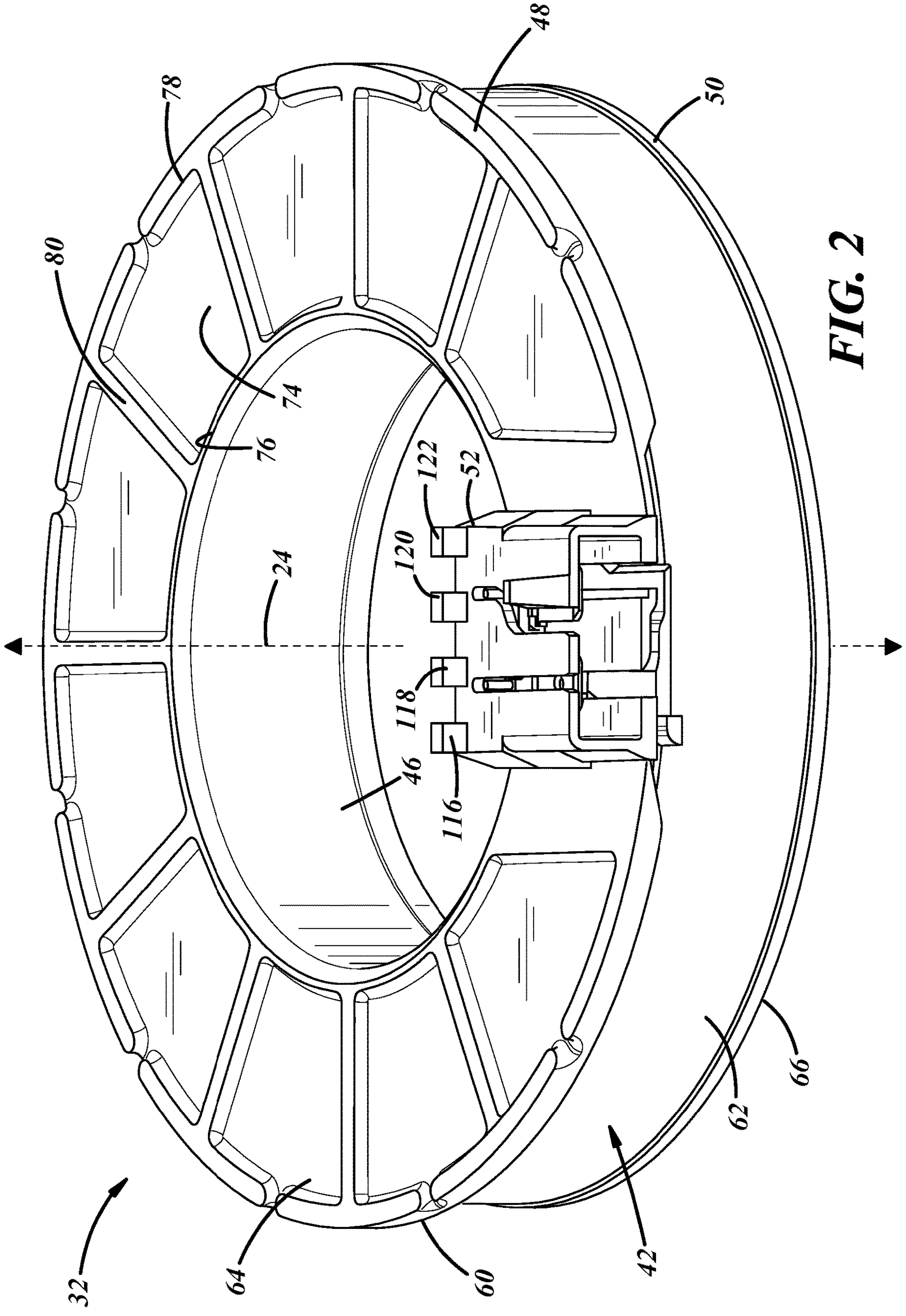
Figure 4:
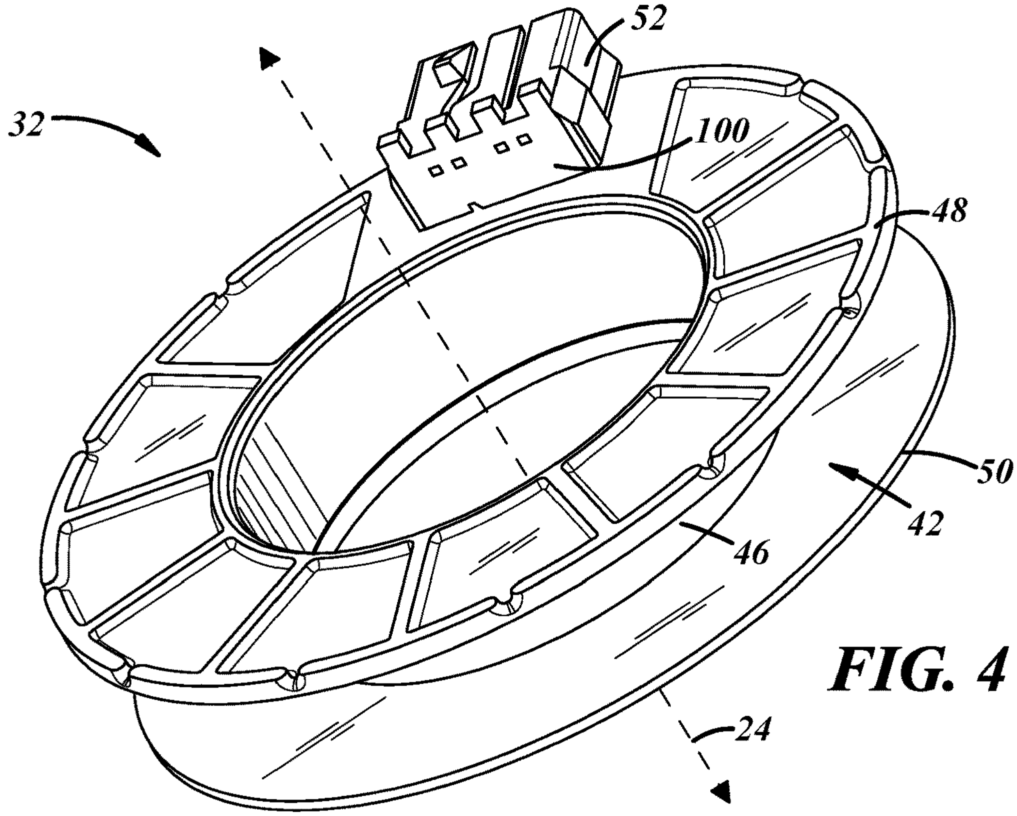

Referring now to FIGS. 2-4, one embodiment of a bobbin wound coil 32 in accordance with the present teachings will be described. Bobbin wound coil 32 includes a bobbin 42 and, with reference to FIGS. 9-10, a coil 44.

Referring again to FIGS. 2-4, bobbin 42 is provided to position and orient coil 44. Bobbin 42 may be made from conventional plastics or other materials having a relatively high magnetic reluctance. Bobbin may include a body 46, end flanges 48, 50 and a terminal connector 52.

Figure 5:
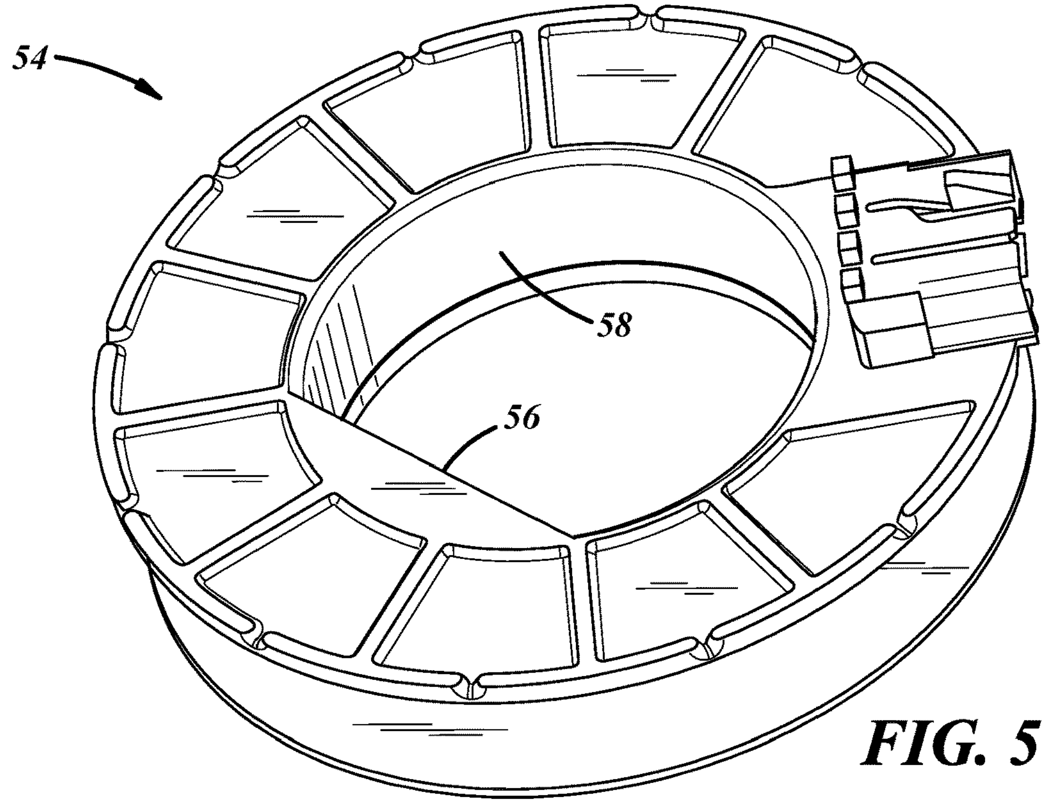
FIG. 5 is a perspective view of another embodiment of a bobbin wound coil in accordance with the teachings herein.

Body 46 is cylindrical in shape and may be disposed about, and centered about, a central axis such as axis 24 in electromagnetic coupling 10. Body 46 defines a central aperture configured to receive a portion of field shell 30. Referring to FIG. 1, a radially inner surface of body 46 may engage inner wall 36 of field shell 30. A radially outer surface of body 46 is configured to support coil 44 once coil 44 is wound onto bobbin 42. In the embodiment shown in FIGS. 2-4, body 46 is cylindrical in shape along its entire axial length. Referring now to FIG. 5, in an alternative embodiment a bobbin wound coil 54 may include means, such as an anti-rotation member in the form of one or more flats 56 extending from a body 58 of the bobbin, for inhibiting rotation of bobbin wound coil 54 relative to field shell 30. Flat 56 may be formed in the radially inner surface of body 58 of the bobbin and may extend along a portion or all of the axial length of body 58. Flat 56 is configured to engage a corresponding flat that may be formed in wall 36 of field shell 30. In this manner, rotation of bobbin wound coil 54 relative to field shell 30 resulting from forces during torque transfer in coupling 10 is inhibited.

Referring again to FIGS. 2-4, end flanges 48, 50, together with body 46, define a space configured to receive, position and retain coil 44. Flanges 48, 50 are disposed at opposite axial ends of body 46 and extend radially outwardly therefrom. Referring to FIG. 3, each flange 48, 50 defines an interior side 60, 62, respectively, facing body 46 and an exterior side 64, 66, respectively, facing away from body 46. The exterior side 64 of flange 48 is configured to support terminal connector 52.

Figure 6:
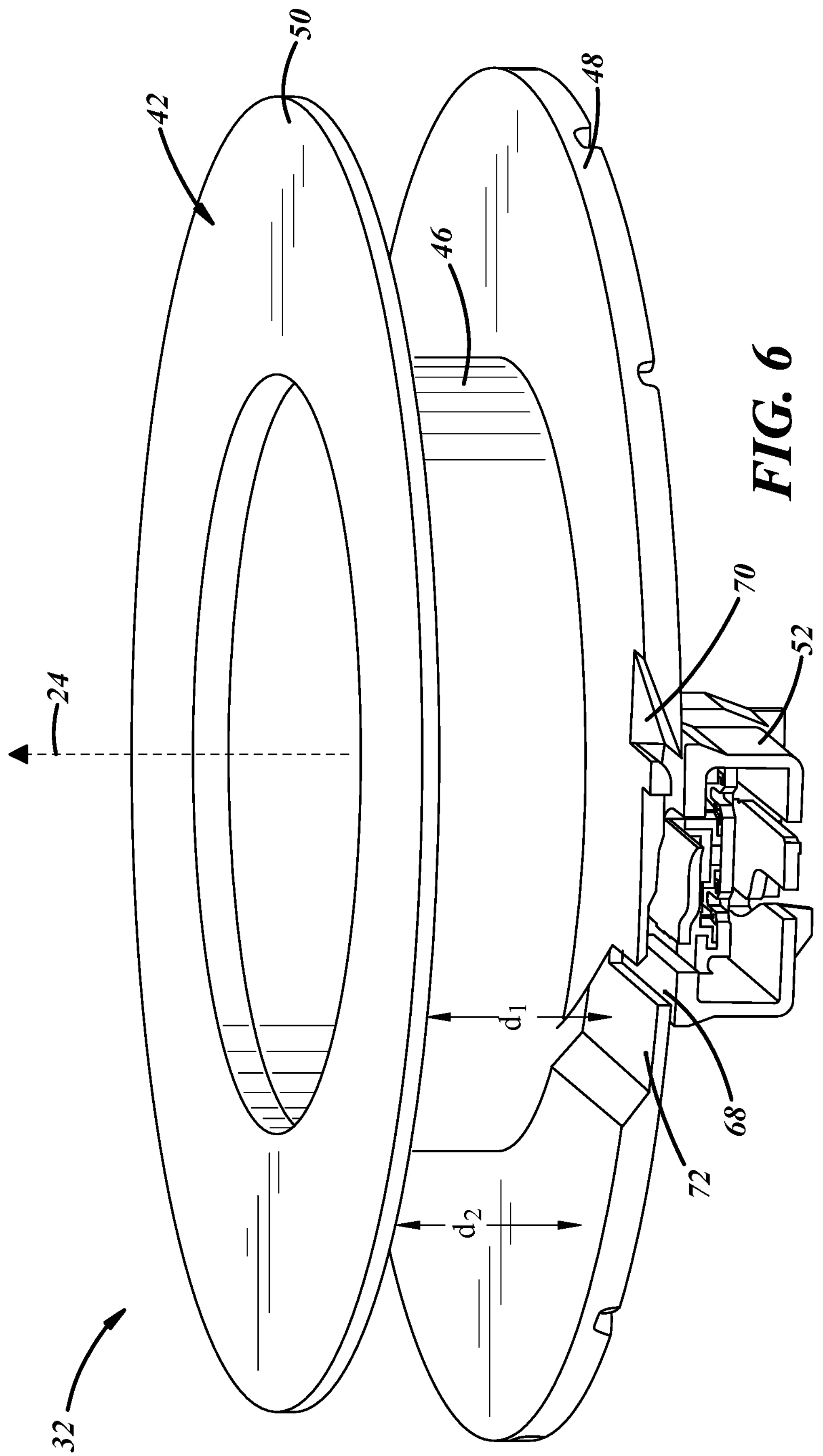
FIG. 6 is another perspective view of the bobbin wound coil of FIGS. 2-4.

The shape and axial thickness of end flange 48 may vary. In particular, the shape and axial thickness of end flange 48 may vary to accommodate the passage of coil 44 from body 46 to terminal connector 52 and the placement of the beginning portion of coil 44. Referring now to FIG. 6, flange 48 defines a pair of openings 68, 70 extending through flange 48 from the exterior side 64 of flange 48 to the interior side 60 of flange 48 and through which beginning and end portions, respectively, of coil 44 may extend. A circumferential section 72 of flange 48 adjacent opening 68 has a reduced axial thickness relative to other circumferential sections of flange 48 such that a distance $d_1$ from the interior side 60 of section 72 of end flange 48 to the interior side 62 of end flange 50 is greater than a distance $d_2$ from the interior side 60 of other circumferential sections of end flange 48 to the interior side 62 of end flange 50. Section 72 is configured to receive a radially extending section of the beginning portion of coil 44 extending between opening 68 and the radially outer surface of body 46 along interior side 60 of section 72 of end flange 48 such that there is no interference with this section of the beginning portion of coil 44 as coil 44 is subsequently wound about body 46.

Figure 7:
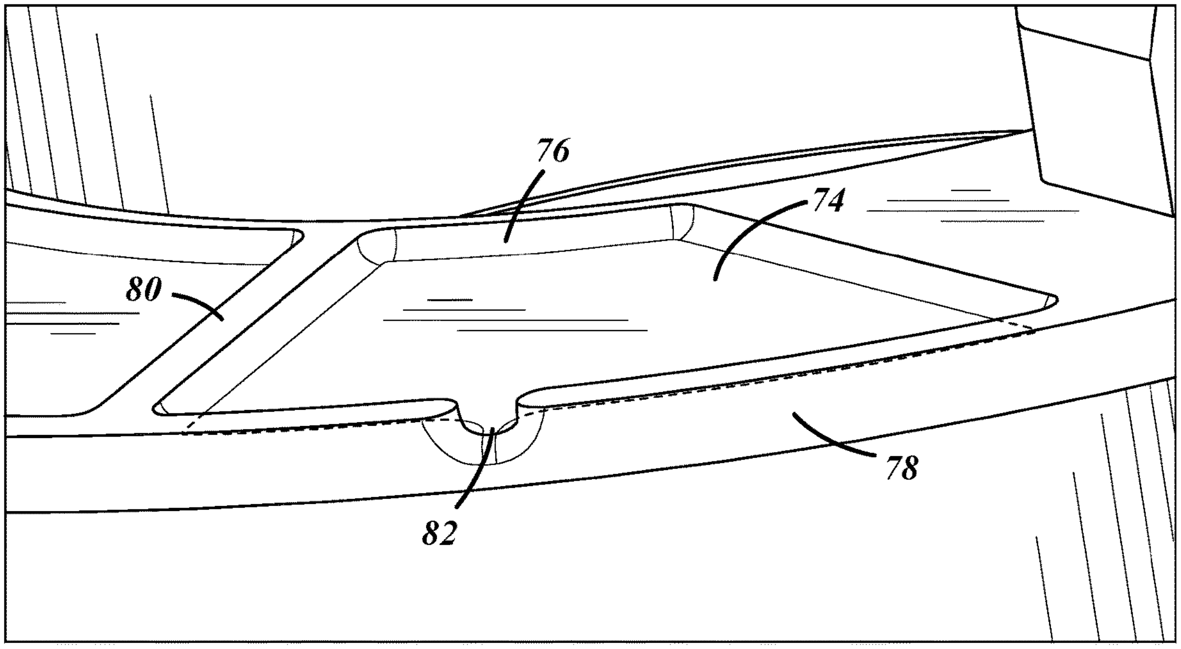
FIG. 7 is an enlarged perspective view of one portion of the bobbin wound coil of FIGS. 2-4 and 6.

Referring again FIG. 2, the axial thickness of flange 48 may further vary to define radially one or more recesses 74 in exterior side 64 of end flange 48 along with inner and outer hubs or walls 76, 78 extending circumferentially about the radially inner and outer edges of flange 48 and a plurality of spokes or side walls 80 extending between walls 76, 78 and bordering recesses 74. Walls 76, 78, 80 provides increased strength to flange 48 while recesses 74 help to reduce the weight of flange 48 and the amount of materials used to form flange 48. Referring now to FIG. 7, each recess 74 on the exterior side 64 of flange 48 is bordered by opposed inner and outer walls 76, 78 and a pair of adjacent, opposed side walls 80. Depending on the application and operating environment for coupling 10, bobbin wound coil 32 may be exposed to fluids or other debris that could potentially collect in recesses 74. In accordance with one aspect of the invention, one or more openings 82 may be formed in outer wall 78 in communication with recess 74 to allow any fluids and other debris collecting in recess 74 to exit recess 74. Fillets may be formed between the surface defining the bottom of recess 74 and the surfaces of wall 78 to facilitate egress of fluids and debris.

Figure 8:
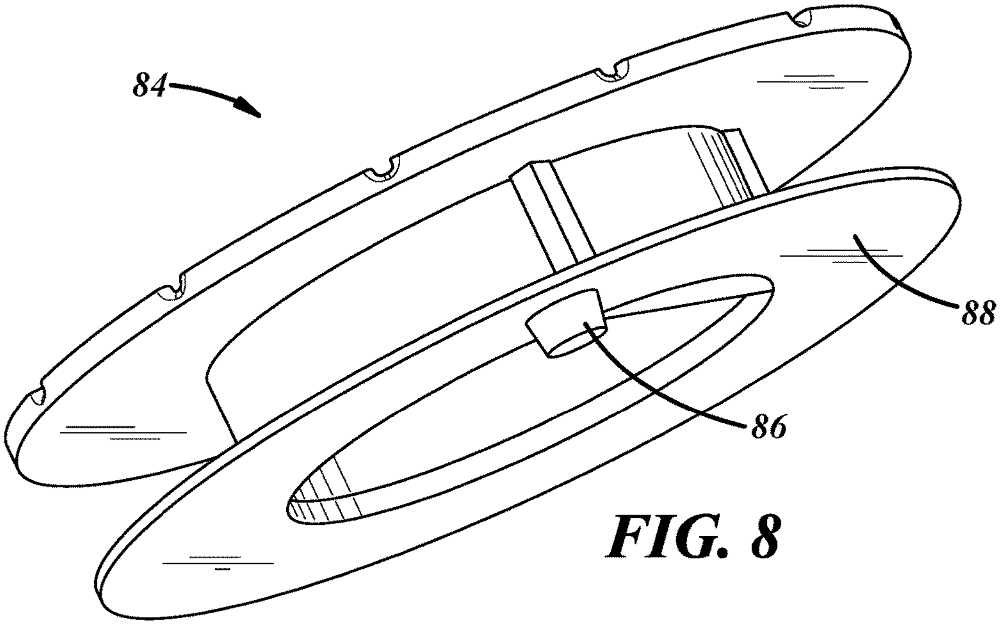
FIG. 8 is a perspective view of another embodiment of a bobbin wound coil in accordance with the teachings herein.

Referring again to FIGS. 2-4, end flange 50 may have a uniform or substantial uniform axial thickness. Referring now to FIG. 8, however, in an alternative embodiment a bobbin wound coil 84 may include means, such as an anti-rotation member in the form of one or more lugs 86 extending axially from a flange 88, for inhibiting rotation of bobbin wound coil 84 relative to field shell 30. Lug 86 may be formed in the exterior side of flange 88 and is configured to engage a corresponding recess formed in wall 34 of field shell 30. In this manner, rotation of bobbin wound coil 84 relative to field shell 30 resulting from forces during torque transfer in coupling 10 is inhibited. Lug 86 may also facilitate proper orientation of bobbin wound coil 84 relative to field shell 30 during assembly of coupling 10.

Figure 9:
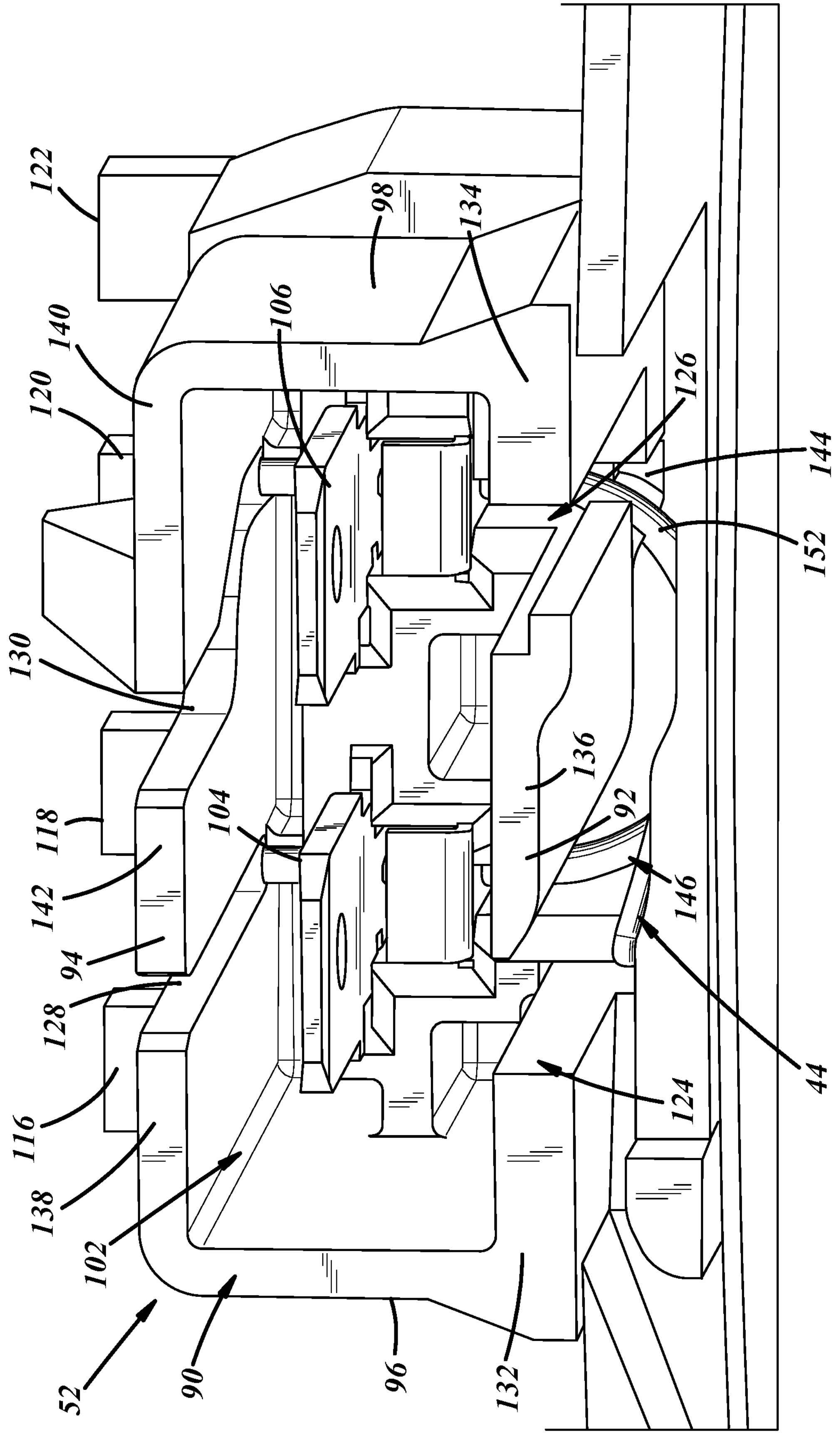
FIGS. 9-10 are enlarged perspective views of one portion of the bobbin wound coil of FIGS. 2-4 and 6.

Referring again to FIGS. 2-4, terminal connector 52 provides a means for connecting coil 44 to an external power source. Connector 52 may be formed with body 46 and flanges 48, 50 as a unitary (one-piece) structure. Connector 52 may be located on the exterior side 64 of flange 48 proximate a radially outer edge of flange 48. Referring now to FIG. 9, connector 52 includes a body 90 including axially spaced inner and outer walls 92, 94, circumferentially spaced side walls 96, 98 extending between walls 92, 94 and, with reference to FIG. 4, a radially inner side wall 100 extending between walls 92, 94. Referring again to FIG. 9, body 90 defines a central cavity 102 bounded by walls 92, 94, 96, 98, 100 that is configured to receive a pair of terminal pins 104, 106 that are supported within cavity 102 for contact with portions of coil 44 and with mating electrical contacts in a corresponding terminal connector for an external power source (not shown) received within cavity 102 upon assembly of coupling 10.

Referring again to FIG. 3, outer wall 94 may include one or more locking tabs 108 extending from an exterior surface of wall 94 of body 90 for securing a connection between terminal connector 52 and the terminal connector for the external power source. In the illustrated embodiment, connector 52 includes a single tab 108 proximate a radially outer end of body 90 of connector 52. Tab 108 may be generally triangular in cross section and, in particular, comprise a right triangle having a radially extending edge 110 along the surface of wall 94, an axially extending edge 112 extending from wall 94 and an inclined edge 114 or ramp extending between edges 110, 112. As the terminal connector for the external power source is moved towards terminal connector 52, tab 108 causes a corresponding locking element on the terminal connector for the external power source to deflect from a standard position and away from wall 94 of terminal connector 52 as it moves along edge 114 of tab 108. Once the locking element reaches the end of edge 114 adjacent edge 112, the locking element will return to its standard position and move towards wall 94 of terminal connector 52 such that tab 108 will inhibit movement of the terminal connector for the external power source in a direction away from terminal connector 52 and disconnection between the two connectors.

Referring again to FIG. 2, in accordance with another aspect of the teachings herein, outer wall 100 may include a plurality of posts 116, 118, 120, 122 extending from the exterior surface of wall 94 of body 90 proximate a radially inner end of body 90 of the terminal connector 52. Posts 116, 118, 120, 122 provide protection for tab 108 during shipping and handling of bobbin wound coil 32 and coupling 10 and at least one of posts (post 120 in the illustrated embodiment) may be radially aligned with tab 108. Referring again to FIG. 9, posts 116, 118, 120, 122 also provide a means for tensioning coil 44 during winding of coil 44 on bobbin 42 and during the insertion of terminal pins 104, 106 into cavity 102 of terminal connector 52 and into contact with coil 44. In particular, when winding of coil 44 begins, the beginning portion of coil 44 is first wound about posts 116, 118 before entering into cavity 102 of terminal connector 52 to provide tension on coil 44 as the coil 44 winds through connector 52 and flange 48 and onto body 46 of bobbin 42. Similarly, at the end of winding coil 44, an end portion of coil 44 exits cavity 102 of terminal connector 52 and is then wound about posts 120, 122 to provide sufficient tension for the end portion of coil 44 when terminal pins 104, 106 are inserted into cavity 102 and into contact with coil 44. Although two posts 116, 118 and 120, 122, respectively, are used in the illustrated embodiment for winding the beginning and end portions of coil 44, it should be understood that the number of posts may vary and that the beginning and end portions of coil 44 may, for example, each be wound about a single post.

Inner and outer walls 92, 94 of terminal connector 52 each includes a pair of openings 124, 126 and 128, 130, respectively, in the form of generally radially extending slots that are configured to receive beginning and end portions of coil 44 during winding of coil 44 onto bobbin 42. Openings 124, 126 and 128, 130 in walls 92 and 94, respectively, extend from a radially outer edge of each wall 92, 94 to a location proximate a radially inner edge of each wall 92, 94 and proximate radially inner side wall 100. Openings 124, 128 may be aligned with each other. Openings 126, 130 may likewise be aligned with each other. Openings 124, 126 and 128, 130 effectively divide each of inner wall 92 and outer wall 94 into three separate sections. In particular, openings 124, 126 divide wall 92 into a pair of circumferential end sections 132, 134 and a center section 136 disposed between circumferential end sections 132, 134 and separated from circumferential end sections 132, 134 by openings 124, 126. Likewise, openings 128, 130 divide wall 94 into a pair of circumferential end sections 138, 140 and a center section 142 disposed between circumferential end sections 138, 140 and separated from circumferential end sections 138, 140 by openings 128, 130. In accordance with another aspect of the teachings herein, a portion of one or more of sections 132, 134, 136 of inner wall 92 may be spaced from side wall 100 to define a recess 144 configured to receive a portion of coil 44. These recesses 144 facilitate proper placement and retention of the beginning and/or end portions of coil 44 within cavity 102 of terminal connector 52 and, in particular, proper placement and alignment of coil 44 withing upper and lower saddles for coil 44 formed in connector 52 on either side of terminal pins 104, 106 when a winding nozzle used to dispense coil 44 and wind coil 44 onto bobbin 42 exits connector 52 thereby insuring proper tension in coil 44 and, ultimately, proper connection between the terminals 104, 106 and the beginning and end portions of coil 44. In the illustrated embodiment, recess 144 is formed in a portion of section 136 of inner wall 92 adjacent opening 126 and receives an end portion of coil 44. It should be understood, however, that a similar recess could be formed in a portion of section 136 adjacent opening 124 to receive a beginning portion of coil 44 or in either of end sections 132, 134 adjacent openings 124, 126, respectively to receive the beginning or end portions of coil 44.

Figure 10:
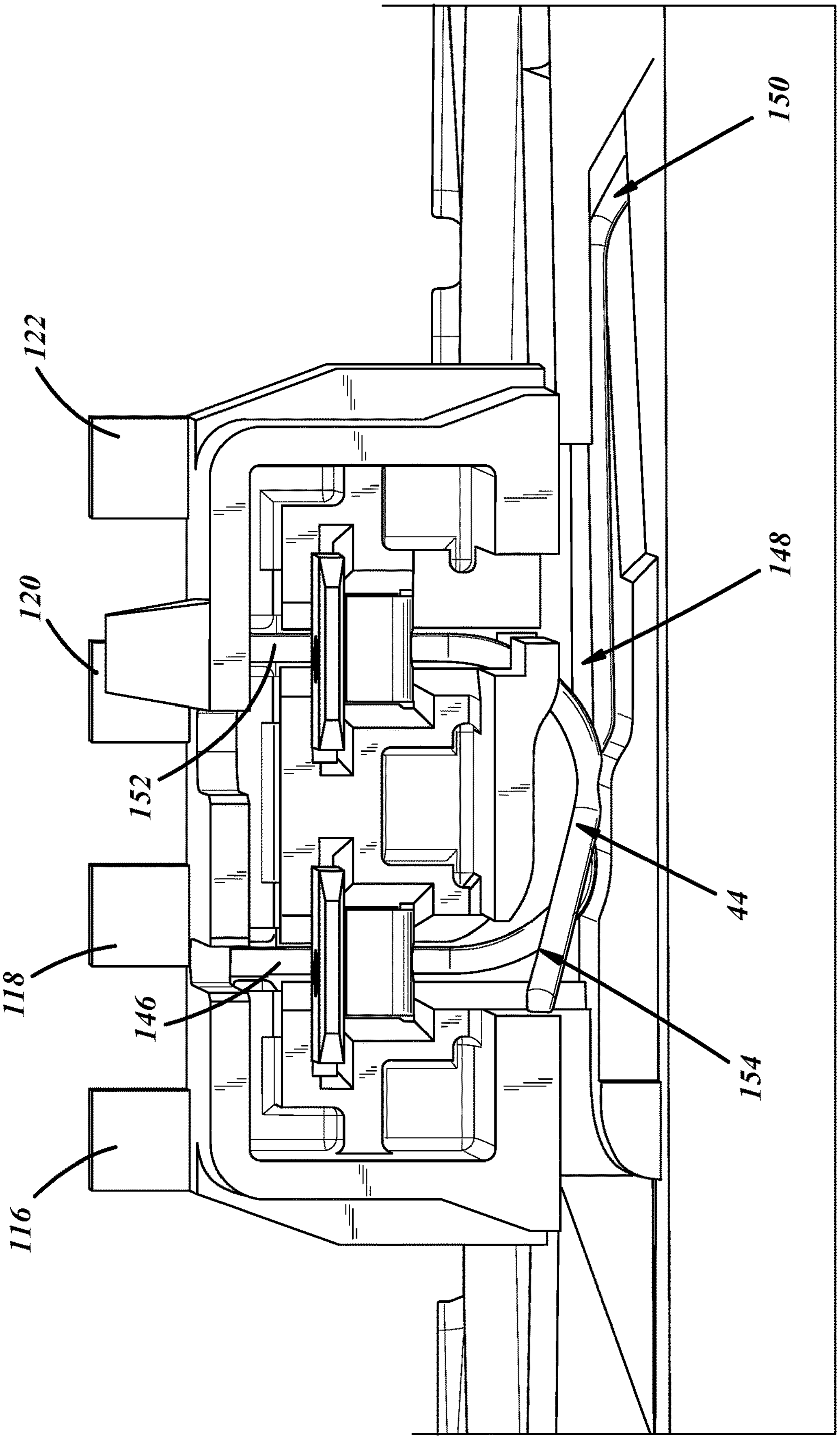

Referring again to FIGS. 9-10, coil 44 is provided to conduct current provided from an external power source and establish an electromagnetic circuit between armature 16 and field shell 30 that attracts armature 16 towards field shell 30 to release the brake. Coil 44 may comprise wire made from copper or other conductive materials. Coil 44 may be wound about bobbin 42 using a conventional coil winding machine in which the coil 44 is dispensed from a nozzle executing a series of predetermined movements relative to bobbin 42. Referring to FIG. 10, the winding of bobbin 42 may begin by winding a beginning portion 146 of coil 44 about posts 116, 118. Referring to FIG. 9, the beginning portion 146 of winding 44 is then fed through opening 128 in outer wall 94 of terminal connector 52 and opening 124 in inner wall 92 of terminal connector 52. As noted above, portion 146 of winding 44 may be positioned within recesses 144 formed in section 132 or section 136 of inner wall 92 adjacent opening 124 if such recesses 144 are provided. Referring again to FIG. 6, after exiting opening 124 in inner wall 92 of terminal connector 52, portion 146 of coil 44 is then fed through opening 68 in flange 48. Referring again to FIG. 10, in accordance with one aspect of the present teachings, a section 148 of portion 146 of coil 44 extends from opening 124 in inner wall 92 of terminal connector 52 to opening 68 in end flange 48 in a circumferential direction past opening 126 in inner wall 92 of terminal connector 52. Coil 44 is then further wound such that another section 150 of beginning portion 146 of coil 44 extends radially inwardly from section 148. Referring again to FIG. 6, section 148 extends along the interior side of circumferential section 72 of end flange 48 towards body 46. A center portion of coil 44 extending between the beginning portion and an end portion of coil 44 is then repeatedly wound about body 46 until a predetermined amount of coil 44 is wound about body 46. An end portion 152 (see FIG. 10) of coil 44 is then fed through opening 70 in end flange 48 and, referring to FIG. 9, opening 126 in inner wall 92 of terminal connector 52. Referring to FIG. 10, in accordance with the present teachings end portion 152 of coil 44 is positioned such that a section 154 of end portion 152 of coil 44 extends from opening 126 in inner wall 92 of terminal connector 52 to opening 70 in end flange 48 in a circumferential direction past opening 124 in inner wall 92 of terminal connector 52 such that section 154 of end portion 152 of coil 44 crosses over section 148 of beginning portion 146 of coil 44. This placement and arrangement of portions 146, 152 of coil 44 inwardly of terminal connector 52 enables placement of section 150 of beginning portion 146 of coil 44 in a location that will not interfere with subsequent winding of coil 44 about body 46 thereby eliminating any need for an outwardly projecting bulge on the exterior side of end flange 48 to accommodate coil 44 and improving manufacturability and packaging of bobbin wound coil 32. Upon passing through opening 126 in inner wall 92 of terminal connector 52, end portion 152 may be located within recess 144 formed in center section 136 of inner wall 92 (or a similar recess 144 formed in circumferential end section 134 of inner wall 92). End portion 152 is then wound through opening 130 in outer wall 94 and about posts 120, 122 before the coil is cut.

A bobbin wound coil 32 in accordance the teachings herein represent an improvement as compared to conventional bobbin wound coils used in electromagnet couplings. In particular, in one embodiment, the bobbin wound coil 32 is configured to eliminate any need for an outwardly projecting bulge on the exterior side of an end flange 48 to accommodate typical wiring patterns thereby improving manufacturability and packaging. In other embodiments, the bobbin wound coil 32 is configured to facilitate tensioning of the beginning and/or end portions 146, 152 of coil 44 and/or securing the beginning and/or end portions 146, 152 of the coil 44 within the terminal connector 52 of the bobbin 42 during winding of the coil 44. In another embodiment, the bobbin 42 is configured to prevent accumulation of liquids or debris in recesses 74 that are formed on the exterior side 64 of an end flange 48 in order to balance competing objectives in strengthening the end flange 48 while reducing weight and material costs. In other embodiments 54 or 84, the bobbin is further configured to prevent relative rotation of the bobbin and field shell 30 in the electromagnetic coupling 10.

While the invention has been shown and described with reference to one or more particular embodiments thereof, it will be understood by those of skill in the art that various changes and modifications can be made without departing from the spirit and scope of the invention.

What is claimed is:

1. A bobbin wound coil for an electromagnetic coupling, comprising:

a bobbin including a cylindrical body disposed about a central axis;

a first end flange disposed at a first axial end of the cylindrical body and extending radially outwardly therefrom, the first end flange defining an interior side facing the cylindrical body and an exterior side facing away from the cylindrical body;

a second end flange disposed at a second axial end of the cylindrical body and extending radially outwardly therefrom, the second end flange defining an interior side facing the cylindrical body and an exterior side facing away from the cylindrical body; and, a terminal connector on an exterior side of the first end flange, the terminal connector including a body defining a central cavity and including axially spaced inner and outer walls, first and second circumferentially spaced side walls extending between the inner and outer walls and a radially inner side wall extending between the inner and outer walls; and, a coil having a beginning portion extending through first openings in each of the inner and outer walls of the body of the terminal connector, an end portion extending through second openings in each of the inner and outer walls of the body of the terminal connector, and a center portion extending between the beginning portion and the end portion and wound about the cylindrical body wherein the inner wall of the body of the terminal connector includes first and second circumferential end sections and a center section disposed between the first and second circumferential end sections and separated from the first and second circumferential end sections by corresponding ones of the first and second openings in the inner wall, and a portion of one of the first circumferential end section, the second circumferential end section, and the center section is spaced from the radially inner side wall to define a first recess configured to receive one of the beginning portion and the end portion of the coil.

2. The bobbin wound coil of claim 1 wherein another portion of one of the first circumferential end section, the second circumferential end section and the center section is spaced from the radially inner wall to define a second recess configured to receive another of the beginning portion and the end portion of the coil.

3. The bobbin wound coil of claim 1 wherein a first portion of the center section is spaced from the radially inner side wall to define the first recess and the first recess is configured to receive the end portion of the coil.

4. The bobbin wound coil of claim 3 wherein a second portion of the center section is spaced from the radially inner side wall to define a second recess and the second recess is configured to receive the beginning portion of the coil.

5. The bobbin wound coil of claim 1 wherein a first portion of the center section is spaced from the radially inner side wall to define the first recess and the first recess is configured to receive the beginning portion of the coil.

6. The bobbin wound coil of claim 1 wherein the beginning portion of the coil extends through a first opening in the first end flange and the end portion of the coil extends through a second opening in the first end flange, the second opening in the inner wall of the terminal connector forward of the first opening in the inner wall of the terminal connector in a first circumferential direction and the second opening in the first end flange rearward of the first opening in the first end flange in the first circumferential direction, the beginning portion of the coil including a first section extending from the first opening in the inner wall of the terminal connector to the first opening in the first end flange and the end portion including a first section extending from the second opening in the inner wall of the terminal connector to the second opening in the first end flange, the first section of the end portion of the coil crossing over the first section of the beginning portion of the coil.

7. The bobbin wound coil of claim 1 wherein an axial thickness of the first end flange varies to define a first recess in the exterior side of the first end flange bordered by a radially inner wall, a radially outer wall and first and second side walls extending radially between the radially inner wall and the radially outer wall, the radially outer wall including a first opening extending therethrough and in communication with the first recess.

8. The bobbin wound coil of claim 1 wherein the terminal connector includes a post extending from an exterior surface of the body of the terminal connector and wherein one of the beginning portion and the end portion of the coil is wound about the post.

9. The bobbin wound coil of claim 1, further comprising an anti-rotation member extending from one of the cylindrical body, the first end flange and the second end flange and configured to engage a field shell of the electromagnetic coupling.

10. The bobbin wound coil of claim 1, further comprising means for inhibiting rotation of the bobbin relative to a field shell of the electromagnetic coupling.

11. A method of forming a bobbin wound coil for an electromagnetic coupling, comprising:

providing a bobbin including
- a cylindrical body disposed about a central axis;
- a first end flange disposed at a first axial end of the cylindrical body and extending radially outwardly therefrom, the first end flange defining an interior side facing the cylindrical body and an exterior side facing away from the cylindrical body;
- a second end flange disposed at a second axial end of the cylindrical body and extending radially outwardly therefrom, the second end flange defining an interior side facing the cylindrical body and an exterior side facing away from the cylindrical body; and,
- a terminal connector on the exterior side of the first end flange, the terminal connector including a body defining a central cavity and including axially spaced inner and outer walls, first and second circumferentially spaced side walls extending between the inner and outer walls and a radially inner side wall extending between the inner and outer walls, the inner wall of the body of the terminal connector including first and second circumferential end sections and a center section disposed between the first and second circumferential end sections and separated from the first and second circumferential end sections by first and second openings in the inner wall, a portion of one of the first circumferential end section, the second circumferential end section, and the center section spaced from the radially inner side wall to define a first recess;

inserting a beginning portion of a coil through the first opening in the inner wall of the terminal connector;

winding the coil about the cylindrical body; and, inserting an end portion of the coil through the second opening in the inner wall of the terminal connector wherein one of the beginning portion and end portion of the coil extends through the first recess.

12. The method of claim 11 wherein another portion of one of the first circumferential end section, the second circumferential end section and the center section is spaced from the radially inner wall to define a second recess and another of the beginning portion and the end portion of the coil extends through the second recess.

13. The method of claim 11 wherein a first portion of the center section is spaced from the radially inner side wall to define the first recess and the end portion of the coil extends through the first recess.

14. The bobbin wound coil of claim 13 wherein a second portion of the center section is spaced from the radially inner side wall to define a second recess and the beginning portion of the coil extends through the second recess.

15. The bobbin wound coil of claim 11 wherein a first portion of the center section is spaced from the radially inner side wall to define the first recess and the beginning portion of the coil extends through the first recess.

16. The method of claim 11 including inserting the beginning portion of the coil through a first opening in the first end flange and inserting the end portion of the coil through a second opening in the first end flange, the second opening in the inner wall of the terminal connector forward of the first opening in the inner wall of the terminal connector in a first circumferential direction and the second opening in the first end flange rearward of the first opening in the first end flange in the first circumferential direction, the beginning portion of the coil including a first section extending from the first opening in the inner wall of the terminal connector to the first opening in the first end flange and the end portion including a first section extending from the second opening in the inner wall of the terminal connector to the second opening in the first end flange, the first section of the end portion of the coil crossing over the first section of the beginning portion of the coil.

17. The method of claim 11 wherein an axial thickness of the first end flange varies to define a first recess in the exterior side of the first end flange bordered by a radially inner wall, a radially outer wall and first and second side walls extending radially between the radially inner wall and the radially outer wall, the radially outer wall including a first opening extending therethrough and in communication with the first recess.

18. The method of claim 11 wherein the terminal connector includes a post extending from an exterior surface of the body of the terminal connector and the method further includes winding one of the beginning portion and the end portion of the coil about the post.

19. The method of claim 11 wherein the bobbin further includes an anti-rotation member extending from one of the cylindrical body, the first end flange and the second end flange and configured to engage a field shell of the electromagnetic coupling.

20. The method of claim 11 wherein the bobbin further includes means for inhibiting rotation of the bobbin relative to a field shell of the electromagnetic coupling.

* * * * *